E. A. CLARK.
LOAF LOADING AND SPACING DEVICE.
APPLICATION FILED JAN. 17, 1916.
1,237,299.
Patented Aug. 21, 1917.
2 SHEETS—SHEET 1.
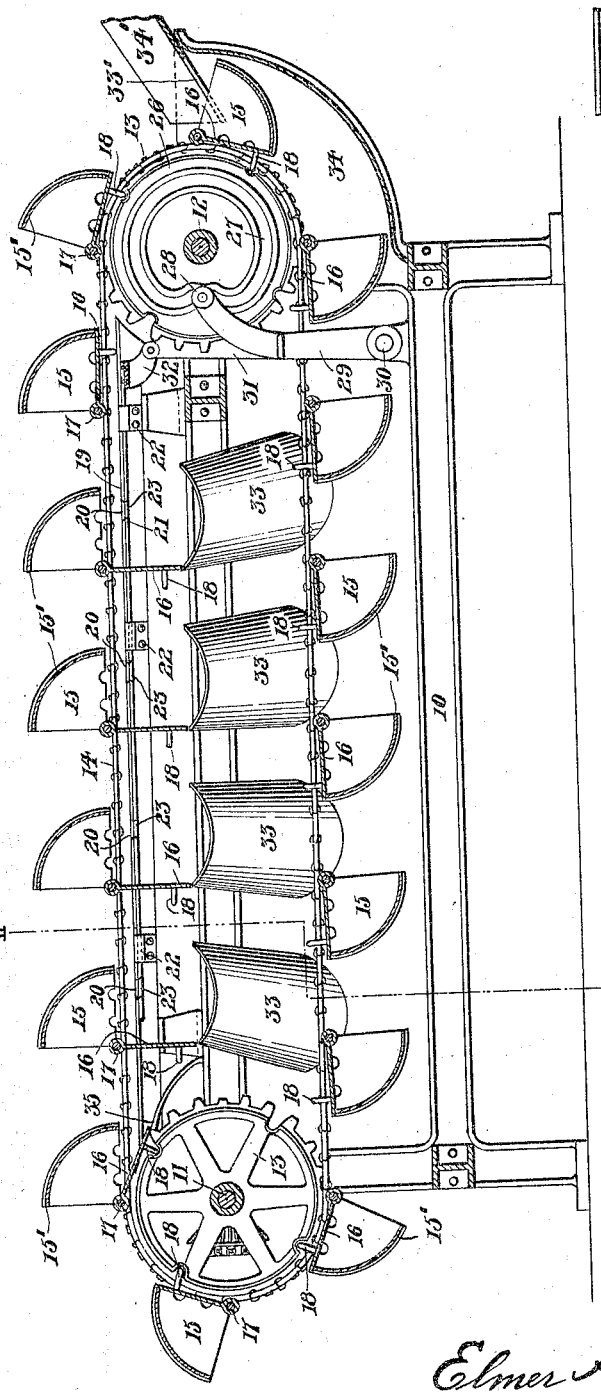
Inventor
Elmer A. Clark
By
J. H. Clarkson
Attorney

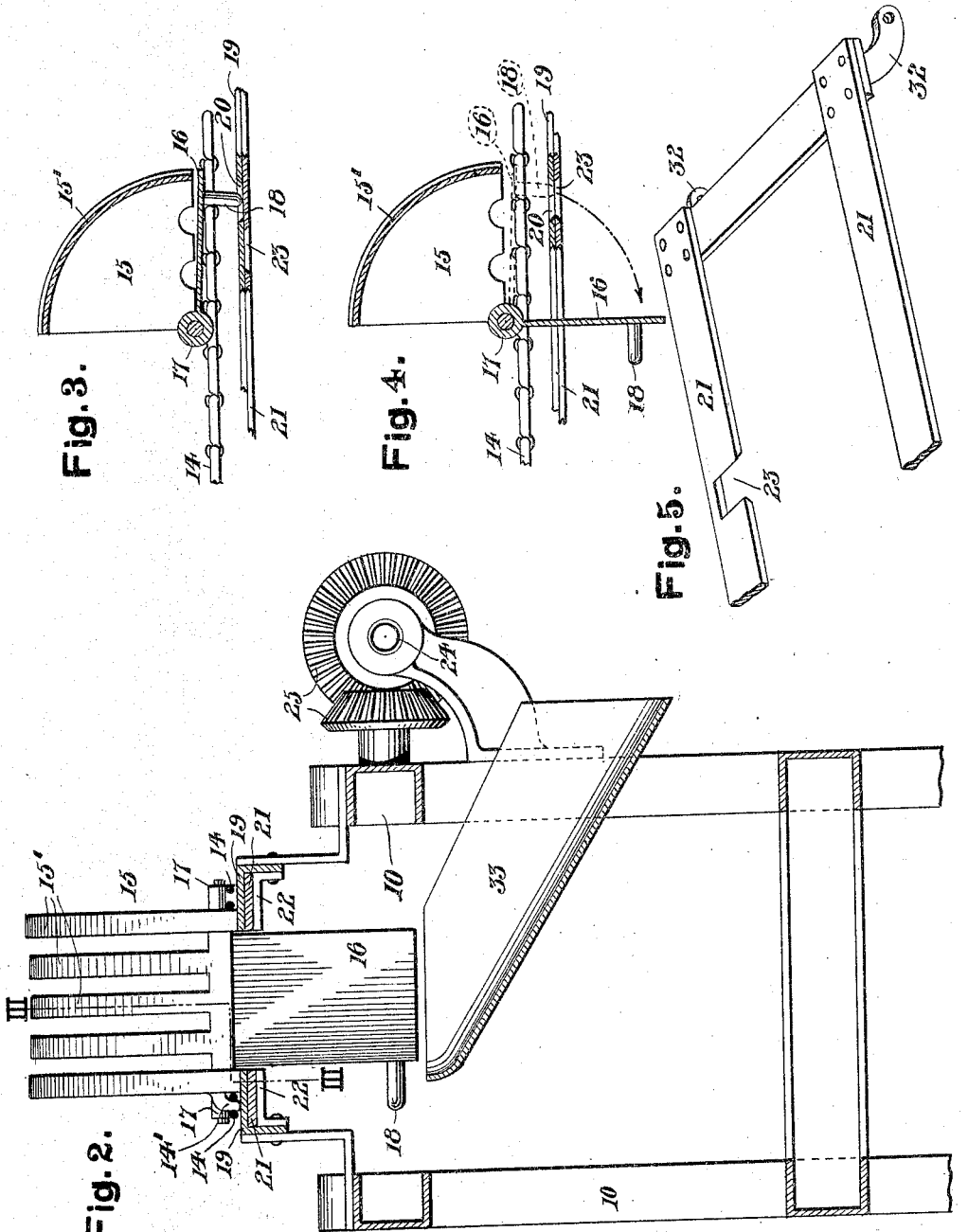

UNITED STATES PATENT OFFICE.

ELMER A. CLARK, OF JOLIET, ILLINOIS.

LOAF LOADING AND SPACING DEVICE.

1,237,299.  Specification of Letters Patent.  Patented Aug. 21, 1917.

Application filed January 17, 1916. Serial No. 72,473.

*To all whom it may concern:*

Be it known that I, ELMER A. CLARK, a citizen of the United States of America, residing at Joliet, in the county of Will and State of Illinois, have invented certain new and useful Improvements in Loaf Loading and Spacing Devices, of which the following is a specification.

This invention relates to bakery machinery and has special reference to a device to accomplish one step in the automatic preparation and transference of loaves from the dough mixer to the oven.

In apparatus of this description there is used what is known as a "proofer" which is a traveling conveyer, made up of a series of buckets of sufficient length to accommodate about four loaves and in which the loaves must be equally spaced apart. These buckets allow the loaves of dough to properly rise, or as it is called "proof up" before molding for the pan and the present invention relates especially to a device for delivering the loaves properly spaced into these "proofer" trays.

One object of the invention is to improve the general construction of devices of this character so that a set, as for instance, four, of loaves may be delivered to each proofer tray as it passes the delivery portion of the device, the loaves being properly spaced to permit free "proofing up."

A second object of the invention is to provide means which will insure the prevention of interference between successive loaves.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a side elevation partly in longitudinal section of a device constructed in accordance with this invention.

Fig. 2 is an enlarged detail section on the line II—II of Fig. 1, certain of the parts being omitted.

Fig. 3 is an enlarged detail section on the line III—III of Fig. 2, and showing the swinging side of the bucket in use, disclosed as shut.

Fig. 4 is a view similar to Fig. 3 but showing the swinging side open.

Fig. 5 is a detail perspective of certain sliding strips used herewith, and

Fig. 6 is a top plan view of the fingered inner end of the hopper.

In carrying out the objects of the invention, in the present embodiment, there is provided a frame 10, wherein are journaled the axles 11 and 12. Mounted on these axles are sprocket wheels 13 which serve to support spaced chains 14 having lugs 14' to which are attached carrying buckets 15 in spaced relation to each other. These buckets are divided into sets, the number of buckets in a set being an aliquot part of the total number of buckets. For instance, in the present showing each set of buckets is four in number and the buckets number in all sixteen. Each of these buckets is provided with a side 16 hinged to the angle of the bucket as at 17, these sides or doors being arranged to drop, at proper times between the chains 14. In order to support these sides in closed position under loaded conditions, and before it is desired to discharge the contents of the buckets, these sides are provided with lugs 18 which travel over fixed strips 19 arranged beneath the upper flights of the chains 14, these strips being provided with spaced openings 20 which are normally closed by means of a sliding strip 21 reciprocable in guides 22 on the frame 10, this sliding strip being provided with openings 23 adapted to be brought to registry with the openings 20 when the sliding strips 21 are in released position.

The shaft 11 is driven from any suitable source of power through a counter-shaft 24 and gears 25. On the shaft 12 is fixed a cam 26 having a cam groove 27 wherein is carried a cam roller 28 journaled on the end of a rock arm 29 fixed to a shaft 30 mounted in suitable bearings on the frame 10. On the shaft 30 is also fixed a plurality of rock arms 31 pivotally connected to brackets 32 on the sliding strips 21. The proportion of the sprocket wheels and cam is such that as each set of four buckets in the present embodiment arrive over respective delivery chutes 33, which are positioned beneath the upper flight of the conveyer, the various openings 23 and 20 will be brought into registry so that the hinged sides 16 of a set may be simultaneously released, thus allowing the loaves carried thereby to drop into the chutes 33 and be delivered to a suitably located proofer tray.

In order to load the buckets 15, I provide a receiving chute 34 concentric with the shaft 12 and this chute is fed from a suitable divider or weigher which is not here shown as the same does not form part of this invention. It is obvious that such divider, proofer and loading device are intended to be so geared together as to make the timing of the delivery of the loaves to the chute 34 act in such manner as to permit but one loaf to be received by a bucket 15, while the proofer trays will be timed to arrive at a point to receive four loaves each from the chutes 33 at the time of delivery of such loaves. The chute 34 has a hopper 34' having a series of fingers 33' in the end adjacent the buckets 15.

In order to restore the sides 16 to closed position, I provide adjacent the sprocket 13 on the shaft 11 a cam member 35 which engages successively with the lugs 18 and raises the sides 16 to closed position, gravity holding these sides when on the lower flight. Each bucket 15 has a corresponding series of fingers 15' which pass between the hopper fingers 33'.

There has thus been provided a simple and efficient device of the kind described and for the purpose specified.

It is obvious that many minor changes may be made in the form and construction of the invention without departing from the material principles thereof.

It is not therefore desired to confine the invention to the exact form herein shown and described, but it is wished to include all such as come within the scope claimed.

Having thus described the invention, what is claimed is:—

1. In a loading device for proofer trays, an endless conveyer provided with a series of spaced loaf receiving buckets each having one side hinged, spaced chutes beneath the upper flight of the conveyer, a fixed and movable plate positioned beneath the upper flight for normally holding the sides closed and arranged to release a plurality of the sides simultaneously at predetermined points in their travel.

2. In a loading device for proofer trays, an endless conveyer provided with a series of spaced loaf receiving buckets each having a hinged side free to open, spaced chutes beneath the upper flight of the conveyer, means over which the buckets move a predetermined distance holding the sides closed and arranged to release a plurality of the sides simultaneously at predetermined points in their travel and a cam surface over which the sides are adapted to travel to restore the opened sides to closed position upon further travel of the conveyer.

3. In a loading device for proofer trays, an endless conveyer provided with a series of spaced loaf receiving buckets each having one side hinged, spaced chutes beneath the upper flight of the conveyer, the upper ends of the chutes being spaced equally with the buckets, and coöperating stationary and movable means normally holding the sides of the loaded buckets closed, the means being free of the buckets and arranged to permit opening of the sides when respective buckets have reached points over respective chutes.

4. In a loading device for proofer trays, an endless conveyer provided with a series of spaced loaf receiving buckets each having one side hinged, spaced chutes beneath the upper flight of the conveyer, the upper ends of the chutes being spaced equally with the buckets, coöperating stationary and movable means normally holding the sides of the loaded buckets closed and constituting a track over which the buckets move predetermined distances, the means being provided with mechanism for effecting an opening of the sides when respective buckets have reached points over respective chutes, and a cam surface over which the sides are adapted to travel to restore the sides to closed position upon further movement of the conveyer.

5. In a loading device, an endless conveyer provided with a series of spaced buckets each having a hinged side provided with a laterally projecting lug, a fixed plate over which the lugs travel when the buckets are loaded, the plate being provided with spaced slots with which the lugs may register in sets, a sliding plate having similarly spaced slots movable into and out of registry with the slots in the fixed plate, and means to cause the slots in the two plates to register at predetermined times.

6. In a device of the class described, a track having spaced openings, a shutter slidable therebeneath to open and close the track openings, a series of movably mounted buckets having closure means retained operative by the track and rendered inoperative by the track openings when uncovered, and a rotary drive for the shutter and the buckets.

7. In mechanism of the class described, a track having spaced openings, a slidable shutter for the track openings, means for intermittently operating the shutter, a plurality of buckets having closure means operable by the track and rendered inoperative by the uncovering of the track openings, and means for moving the buckets and operably connected with the first means for operating the latter.

8. In mechanism of the class described, a plurality of buckets having unlocked closure means, an endless support for the buckets, a sprocket drive for the support, a track arranged adjacent the support for maintaining the closure means operative and provided with means to permit the closure means to open, and mechanism operable by the sprocket drive for intermittently rendering the track means operative and inoperative.

In testimony whereof I affix my signature in the presence of two witnesses.

ELMER A. CLARK.

Witnesses:
LEO P. WARD,
MARTIN LUNDQUIST.